(12) United States Patent
Shimamura

(10) Patent No.: US 6,266,089 B1
(45) Date of Patent: Jul. 24, 2001

(54) IMAGE SENSING INTEGRATED CIRCUIT DEVICE

(75) Inventor: Nobutoshi Shimamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 08/989,002

(22) Filed: Dec. 11, 1997

(30) Foreign Application Priority Data

Dec. 12, 1996 (JP) .................................................. 8-331820

(51) Int. Cl.[7] .................................................. H04N 3/14
(52) U.S. Cl. .......................... 348/301; 348/308; 348/310; 250/208.1; 358/482
(58) Field of Search .............................. 250/208.1, 208.3, 250/215; 257/215, 231, 232, 233, 234, 288, 291, 292; 358/474, 482, 483; 348/207, 294, 300, 301, 302, 303, 304, 307, 308, 309, 310, 311, 332; H04N 3/14, 3/12

(56) References Cited

U.S. PATENT DOCUMENTS

| | | | |
|---|---|---|---|
| 4,845,567 | * 7/1989 | Yamaguchi | 358/482 |
| 5,027,226 | * 6/1991 | Nagata | 348/294 |
| 5,408,113 | * 4/1995 | Kanno | 250/208.1 |
| 5,784,178 | * 7/1998 | Tsai | 358/482 |
| 6,025,935 | * 2/2000 | Tseng | 358/483 |

* cited by examiner

Primary Examiner—Wendy R. Garber
Assistant Examiner—Ngoc-Yen Vu
(74) Attorney, Agent, or Firm—Arent Fox Kintner Plotkin and Kahn, PLLC

(57) ABSTRACT

An image sensor has a plurality of sensor integrated circuit devices of the same configuration arranged in a row. Each sensor integrated circuit device has a plurality of light-sensing elements, a sensor circuit for successively outputting the outputs of these light-sensing elements, and an amplifier circuit. It further has a first output terminal for directing the output of the sensor circuit out of the sensor integrated circuit device, an input terminal for directing an external signal to the amplifier circuit, and a second output terminal for directing the output of the amplifier circuit out of the sensor integrated circuit device. The first output terminal of each sensor integrated circuit device is connected to the input terminal of a particular sensor integrated circuit device so that the output of every light-sensing element is amplified by the amplifier circuit of that particular sensor integrated circuit device alone.

3 Claims, 3 Drawing Sheets

IMAGE SENSING INTEGRATED CIRCUIT DEVICE

BACKGROUND OF THE INVENTION

1. Field of the Invention

The present invention relates to a sensor IC (integrated circuit) device and an image sensor incorporating such a sensor IC device for use in facsimile machines, image scanners, and others for image reading purposes.

2. Description of the Prior Art

A conventional sensor IC device and a contact image sensor (hereafter also referred to as a CIS) incorporating it will be described with reference to FIGS. 2 and 3. As shown in FIG. 2, a conventional CIS is composed of a plurality of sensor IC devices 21. Each sensor IC device 21 includes an array of, for example, 96 light-sensing elements 23 such as phototransistors. Each light-sensing element 23 corresponds to one pixel.

By the side of each sensor IC device 21, an LED (light-emitting diode) 20 is provided that illuminates with light a paper sheet or other having an image to be read formed on it. Thus, the light-sensing elements 23 output electric signals in accordance with the light reflected from the paper sheet or other. The sensor IC device 21 successively outputs the signal from one light-sensing element 23 after another. Since the signal outputted from the sensor IC device 21 is feeble, it is then amplified by an amplifier 22 that is provided separately from the sensor IC devices 21. This operation is repeated to read the entire image on the paper sheet or other.

On the other hand, as shown in FIG. 3, in another type of conventional CIS, each sensor IC device 24 incorporates an amplifier circuit 25. Accordingly, the sensor IC device 24 outputs the signal from each light-sensing element 23 after amplifying the signal with its own amplifier circuit 25, and thus the signal outputted from the sensor IC device 24 is used intact as the output of the CIS. Note that, in FIG. 3, such components as are found also in FIG. 2 are identified with the same reference numerals, and overlapping explanations will not be repeated.

However, the CIS shown in FIG. 2 requires an amplifier 22 as a separate component. Quite inconveniently, this requires not only extra space to mount the amplifier, but also extra wiring for it, and thus leads to reduced reliability and to increased cost. On the other hand, the CIS shown in FIG. 3 suffers from variation in "dark output voltage" (that is, the voltage that the CIS outputs when it receives no reflected light), because the offset voltage of the amplifier circuit 25 incorporated in each sensor IC device 24 varies slightly from one sensor IC device to another. Quite inconveniently, making the dark output voltage constant requires extra measures, such as trimming, that are difficult to realize.

SUMMARY OF THE INVENTION

An object of the present invention is to provide a sensor IC device and an image sensor incorporating it that require fewer separate components and thus are more reliable and require less cost for the purchase and maintenance of their components and that are free from variation in dark output voltage between individual sensor IC devices.

To achieve the above object, a sensor IC device according to the present invention is provided with: a sensor circuit having a plurality of light-sensing elements for outputting the outputs of the light-sensing elements one after another; an amplifier circuit provided separately from the sensor circuit; a first output terminal for directing the output of the sensor circuit out of the sensor IC device; an input terminal for directing an external signal to the amplifier circuit; and a second output terminal for directing the output of the amplifier circuit out of the sensor IC device.

On the other hand, an image sensor according to the present invention includes a plurality of sensor IC devices as described above, and, in this image sensor, the first output terminal of each of the sensor IC devices is connected to the input terminal of a particular one of the sensor IC devices so that the output of every light-sensing element is amplified by the amplifier circuit provided in that particular one of the sensor IC devices.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
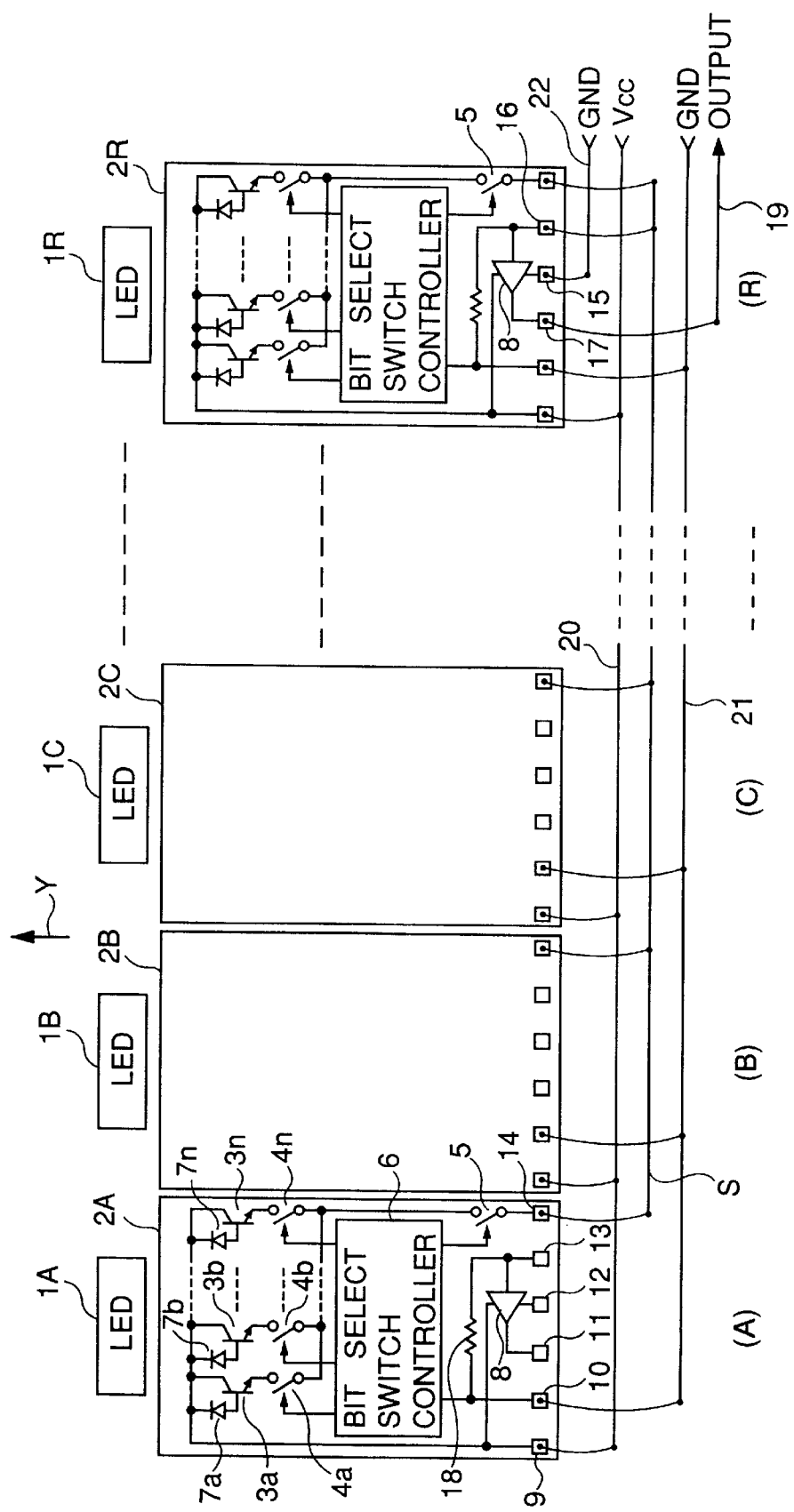
FIG. 1 is a circuit diagram of the principal portion of an image sensor embodying the present invention.
Figure 2:
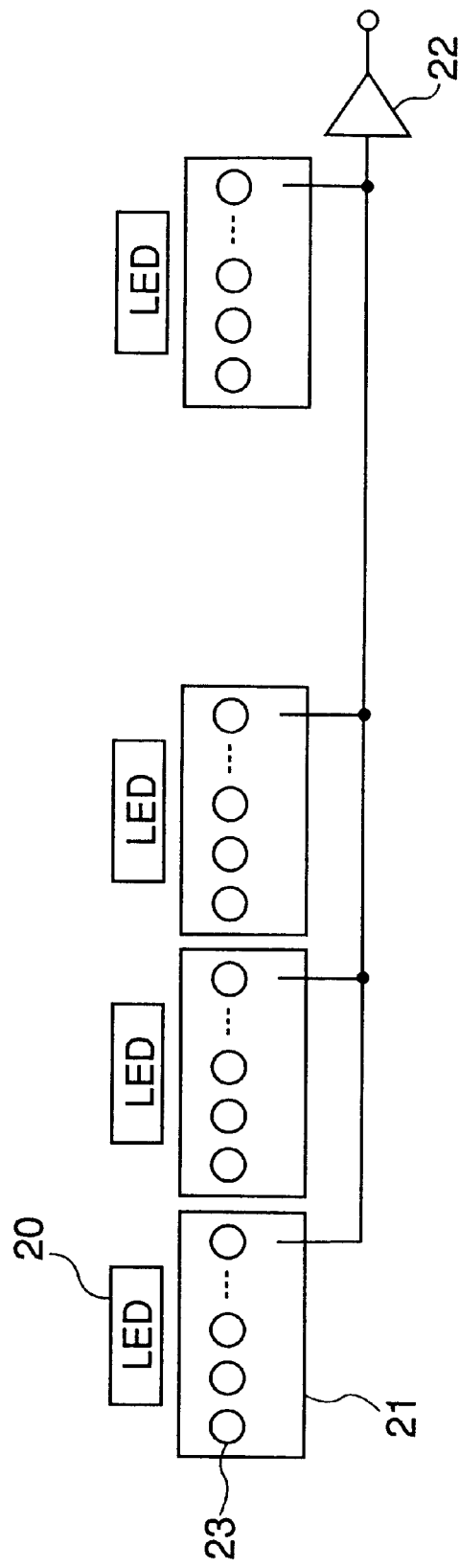
FIG. 2 is a circuit diagram of the principal portion of a conventional image sensor incorporating conventional sensor IC devices.

An embodiment of the present invention will be described with reference to FIG. 1. FIG. 1 is a circuit diagram of the principal portion of a contact image sensor (CIS) embodying the invention. As shown in the figure, this CIS is composed of, for example, 18 sensors 2A, 2B, 2C, . . . , 2R arranged in positions (A), (B), (C), . . . , (R). These sensors are formed as ICs (integrated circuits). By the side of the sensors, light-emitting diodes 1A, 1B, 1C, . . . , 1R are provided that are used as a light source. Each sensor has one terminal 9 connected to a power voltage (Vcc) line 20 by wire bonding and has one terminal 10 connected to a ground voltage (GND) line 21 by wire bonding.

The sensors are constructed, if the sensor 2A is taken as an example, as follows. The sensor 2A includes an array of, for example, 96 photodiodes 7a, 7b, . . . , 7n. When an image formed on a paper sheet or other is read by a portable handy copier incorporating the image sensor shown in FIG. 1, the handy copier is moved in one direction (the direction indicated by arrow Y in the figure) while the paper sheet or other is illuminated with light by the light-emitting diodes 1A, 1B, 1C, . . . , 1R. In accordance with the light reflected from the paper sheet or other, the photodiodes 7a, 7b, . . . , 7n, each of which corresponds to one pixel, output electric signals. These signals are then amplified by transistors 3a, 3b, . . . , 3n.

A bit select switch controller 6 turns on and off switching elements 4a, 4b, . . . , 4n in such a way that only one among them is on at a time. The switching elements 4a, 4b, . . . , 4n are provided one for each of the photodiodes 7a, 7b, . . . , 7n. The switching elements 4a, 4b, . . . , 4n are typically formed by using transistors designed for switching operation. Although not shown in the figure, each sensor receives a control signal when, for example, a preceding sensor has completed output from its own photodiodes. In accordance with this control signal and in synchronism with a clock, the bit select switch controller 6 turns on another switching element 5 and successively turns on and off the switching elements 4a, 4b, . . . , 4n. Thus, on receiving such a control signal from a microcomputer or other (not shown), the bit select switch controller 6 successively outputs the signal from one photodiode after another. The other sensors 2B, 2C, . . . , 2R have exactly the same construction as the sensor 2A.

The signal from one of the photodiodes 7a, 7b, . . . , 7n as selected by the switching elements 4a, 4b, . . . , 4n at a particular moment is delivered to a terminal 14 for output when the switching element 5 is on. Conversely, while this switching element 5 is off, the sensor 2A does not output any signal. The switching elements 4a, 4b, . . . , 4n are turned on one after another by the bit select switch control circuit 6. This causes the signal from one photodiode after another to be outputted successively. Thereafter, the other sensors 2B, 2C, . . . , 2R, one after another, perform successive output of the signals from their photodiodes in the same manner.

Although the sensor 2A incorporates an amplifier circuit 8, the CIS of the embodiment uses only the amplifier circuit 8 of the sensor 2R at position (R). In the other sensors, the terminals 11, 12, and 13 that connect to their respective amplifier circuit 8 are left unused.

Within each of the sensors 2A to 2R, to stabilize the state of their amplifier circuit 8, the input of the amplifier circuit 8 is connected through a resistor 18 to a logical ground (GND) line so that the voltage at the input of the amplifier circuit 8 is stabilized. This eliminates the need, in the sensors whose amplifier circuit 8 is unused, to stabilize the state of the amplifier circuit 8 by connecting the terminals 11 to 13 to, for example, an output line 19, an analog ground (GND) line 22, and a signal line S. This not only contributes to stable operation of each sensor as a whole, but also helps eliminate unnecessary flows of current through the amplifier circuit 8 and thus save the electric power consumed for nothing therein.

Each sensor outputs the signal from the photodiodes 7a, 7b, . . . , 7n to a signal line S. The signal line S is a conductive pattern that is long enough to be connected with all the sensors 2A, 2B, 2C, . . . , 2R without the intervention of the amplifier circuits 8, and therefore has a relatively low impedance. Accordingly, the signal line S is laid between the power voltage (Vcc) line 20 and the ground (GND) line 21 on a printed circuit board. This makes the signal line S less susceptible to noise.

Moreover, the signal line S is connected to an input terminal 16 of the sensor 2R at position (R) by wire bonding so that the signal outputted from the output terminal 14 of each of the sensors 2A, 2B, 2C, . . . , 2R is fed to the amplifier circuit 8 of the sensor 2R at position (R) for amplification. The sensor 2R has one terminal 15 connected to an analog ground (GND) line 22 and has one terminal 17, to which the output of its amplifier circuit 8 is delivered, connected to an output line 19.

Now, suppose that the switching element 5 of the first sensor 2A is turned on, and the switching elements 4a, 4b, . . . , 4n of the same sensor are turned on one after another so that only one among them is on at a time. This causes the photoelectric currents produced in the photodiodes 7a, 7b, . . . , 7n of the sensor 2A to be, one after another, amplified by the transistors 3a, 3b, . . . , 3n, then delivered via the switching element 5 and the terminal 14 to the signal line S, and then delivered to the last sensor 2R via its input terminal 16 so as to be amplified by the amplifier circuit 8 of that sensor 2R. The resulting amplified signal is outputted via the output terminal 17 to the output line 19. When the sensor 2A finishes outputting the photoelectric current from its photodiode 7n to the signal line S, the switching element 5 of the sensor 2A is turned off. Subsequently, the switching element 5 (not shown) of the next sensor 2B is turned on, and the photoelectric currents produced in the photodiodes of the sensor 2B are, one after another, outputted, amplified by the amplifier circuit 8 of the sensor 2R, and then outputted to the output line 19 in the same manner. Thereafter, the same operations are repeated for the other sensors, until eventually the photoelectric currents produced in all photodiodes of all sensors are outputted to the output line 19.

As described above, the signals from all the sensors are amplified and outputted to the output line 19 by the amplifier circuit 8 of the sensor 2R at position (R), and therefore it is not necessary to provide the image sensor shown in FIG. 1 as a whole with an additional amplifier as a separate component.

Thus, only the amplifier circuit 8 of the sensor 2R at position (R) is used, whereas those of the other sensors 2B, 2C, . . . , 2R are left unused. However, all these sensors 2A, 2B, 2C, . . . , 2R can be fabricated in the same manner regardless of whether their amplifier circuit 8 will actually be used or not, and it is even possible to select, when a CIS is assembled, the most conveniently located one out of available amplifier circuits 8. This facilitates the assembly of a CIS.

Figure 3:
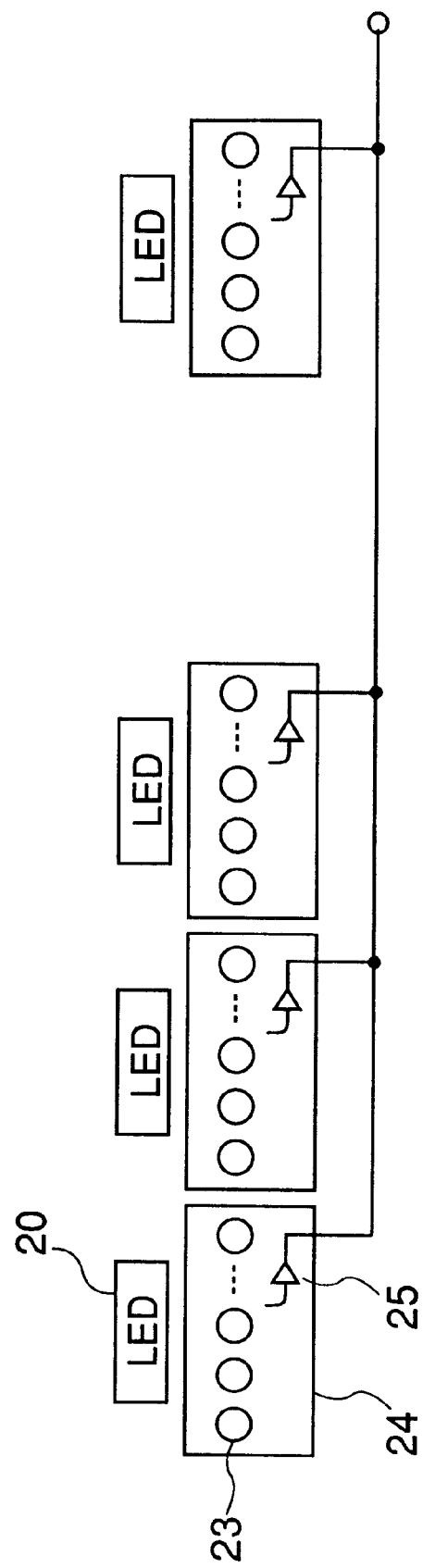
FIG. 3 is a circuit diagram of the principal portion of another conventional image sensor incorporating conventional sensor IC devices of another type.

Moreover, since only one of the amplifier circuits 8 available in a CIS is used, even if the amplifier circuits 8 of different sensors have different characteristics, the CIS as a whole is free from variation in the dark output voltage resulting from the sensor-to-sensor difference in the offset voltages of the amplifier circuits 8 as is inevitable in the conventional CIS shown in FIG. 3.

The CIS of the embodiment allows various modifications and variations. For example, it is possible to make the CIS color image ready by using three light-emitting diodes of different colors as the light-emitting diodes 1A, 1B, 1C, . . . , 1R; it is possible to use any light-sensing element such as phototransistors instead of the photodiodes 7a, 7b, . . . , 7n; it is possible to use the amplifier circuit 8 of any sensor other than the one at position (R); it is possible to connect the terminal 15 to, instead of the analog ground (GND) line 22, a ground line common to analog and digital circuitry as long as the digital ground voltage (GND) line 21 is free from harmful noise. Moreover, in the sensors 2A, 2B, 2C, . . . , 2R, it is also possible to omit the amplifying transistors 3a, 3b, . . . , 3n and connect the anodes of the photodiodes 7a, 7b, . . . , 7n directly to the switching elements 4a, 4b, . . . , 4n, respectively.

As described heretofore, according to the present invention, for example, in an image sensor composed of a plurality of sensor IC devices of the same configuration, it is possible to connect, by external wiring, the first output terminal of each sensor IC device to the input terminal of one sensor IC device and connect also the first output terminal of this one sensor IC device to its own input terminal so that the outputs of all the sensor IC devices are amplified by the amplifier circuit incorporated in that one sensor IC device. This makes it possible to amplify the outputs of all the sensor IC devices uniformly with a single amplifier circuit and thus eliminate variation in the sensor signal resulting from the difference in characteristics between different amplifier circuits. In addition, the amplifier circuits are provided within the sensor IC devices, and therefore it is not necessary to provide amplifiers as separate components. This helps increase reliability and reduce cost.

What is claimed is:

1. An image sensor including a plurality of sensor integrated circuit devices each comprising a sensor circuit having a plurality of light-sensing elements for outputting outputs of the light-sensing elements one after another, an amplifier circuit provided separately from the sensor circuit, a first output terminal for directing an output of the sensor circuit out of the sensor integrated circuit device, an input terminal for directing an external signal to the amplifier circuit, and a second output terminal for directing an output of the amplifier circuit out of the sensor integrated circuit device, wherein the first output terminal of each of the sensor integrated circuit devices is connected to the input terminal of a particular one of the sensor integrated circuit devices so that the output of every light-sensing element is amplified by the amplifier circuit provided in that particular one of the sensor integrated circuit devices.

2. A sensor integrated circuit device as claimed in claim 1, wherein the amplifier circuit has its input connected to a ground voltage line inside the sensor integrated circuit device.

3. A sensor integrated circuit device as claimed in claim 2, wherein the sensor circuit is provided with a plurality of transistors for individually amplifying output currents of the light-sensing elements and a switching circuit for outputting the thus amplified output currents one after another.

* * * * *